July 7, 1925.

W. P. FLYNN

LUBRICATING DEVICE

Filed Feb. 8, 1924

1,545,048

Inventor
W. P. Flynn

By D. Swift

Attorney

Patented July 7, 1925.

1,545,048

UNITED STATES PATENT OFFICE.

WALTER P. FLYNN, OF REDWOOD VALLEY, CALIFORNIA.

LUBRICATING DEVICE.

Application filed February 8, 1924. Serial No. 691,432.

*To all whom it may concern:*

Be it known that I, WALTER P. FLYNN, a citizen of the United States, residing at Redwood Valley, in the county of Mendocino, State of California, have invented a new and useful Lubricating Device; and I do hereby declare the following to be a full, clear, and exact description of the invention, such as will enable others skilled in the art to which it appertains to make and use the same.

The invention relates to lubricating devices for clutch collars disposed at the rear end of an internal combustion engine, and has for its object to provide a pipe connection between the breather pipe, at the forward end of the engine, and the engine casing, adjacent the clutch collar, whereby lubricant will be conveyed and discharged on the clutch collar when oil is poured into the breather pipe.

A further object is to provide the forward end of the pipe with an upwardly extending deflecting scoop, which will deflect oil into the pipe when oil is being poured through the breather pipe to the crank casing of the engine.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
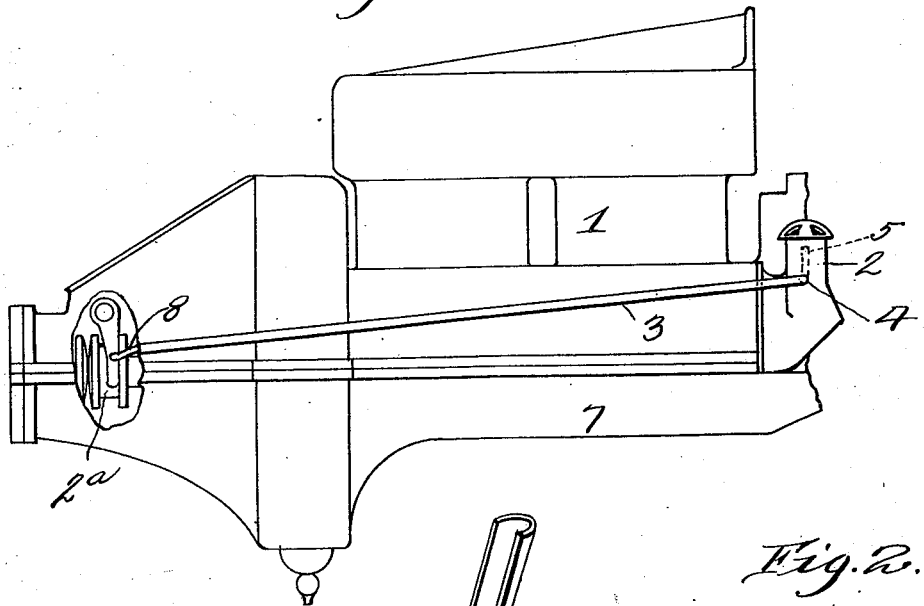
Figure 1 is a side elevation of a conventional form of internal combustion engine showing the device applied thereto.
Figure 3:
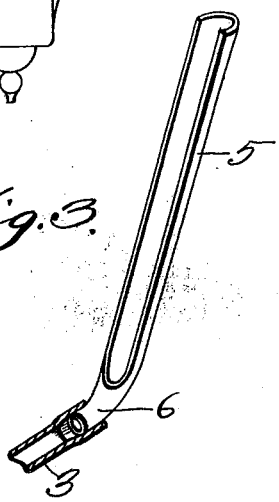
Figure 3 is a perspective view of the oil scoop carried by the lubricant pipe.
Figure 2:
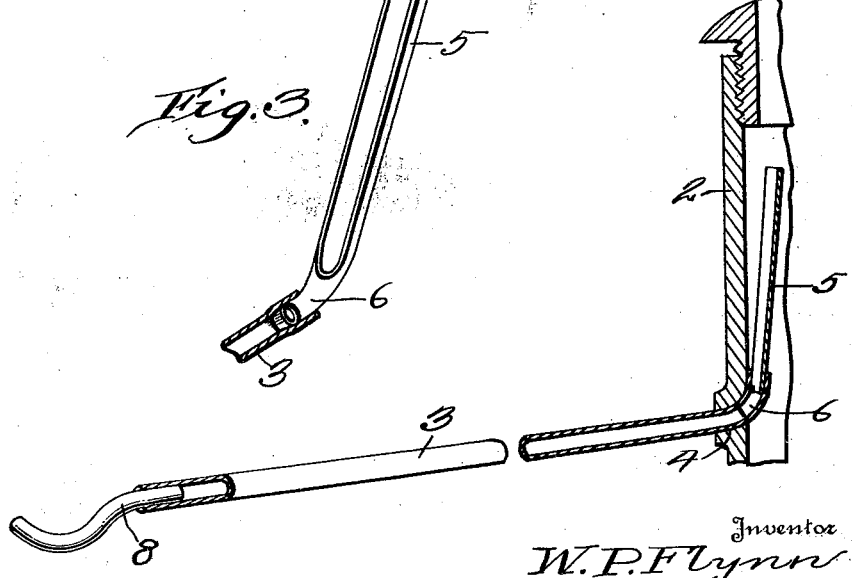
Figure 2 is a vertical sectional view through a portion of the breather pipe of the engine showing the lubricant pipe applied thereto.

Referring to the drawing, the numeral 1 designates a conventional form of internal combustion engine and 2 the breather pipe at the forward end thereof. It has been found that the slidable clutch control collar 3 of engines of this character are not properly lubricated, consequently become stuck and work hard. To obviate this difficulty an inclined pipe 3 is provided, one end of which extends through an aperture 4 in the breather pipe 2 and terminates in an upwardly extending removable tapered scoop 5, the lower curved end 6 of which engages in the forward end of the inclined tube 4. When oil is poured into the upper end of the breather pipe 2 for filling the crank casing 7 of the engine, the tapered scoop 5, which inclines upwardly towards the axis of the breather pipe, will scoop a portion of the lubricant from the main stream thereof and cause the same to flow into the pipe 3. The rear end of the pipe 3 has detachably connected thereto an angularly shaped pipe 8 which extends into the rear end of the engine to a position where lubricant which flows through the pipe 3 and pipe 8 will be discharged onto the clutch collar $2^a$, thereby thoroughly lubricating the clutch collar at the rear end of the engine every time lubricant is poured into the crank casing through the breather pipe 2 at the forward end of the engine. If so desired the device may be permanently attached to the engine, or attached thereto whenever it is desired to lubricate the clutch.

From the above it will be seen that lubricating means is provided for the clutch collar of an internal combustion engine, whereby every time oil is poured into the breather pipe of the engine, a portion thereof will flow towards and be discharged onto the clutch collar. It will also be seen that the device is simple in construction, may be easily and quickly applied to a conventional form of internal combustion engine without materially altering the construction thereof, and the device may be cheaply manufactured and sold.

The invention having been set forth what is claimed as new and useful is:—

1. The combination with an internal combustion engine, a breather pipe carried by said engine, and through which oil is adapted to be poured, and a clutch pull collar carried by said engine, of means for lubricating said pull collar when oil is poured into the breather pipe, said means comprising a pipe extending into the passage of the breather pipe and an upwardly inclined scoop carried by said pipe and inclined towards the axis of the breather pipe and disposed within the breather pipe, said pipe having its other end terminating adjacent the clutch pull collar.

2. The combination with an internal combustion engine having a clutch pull collar at its rear end and a breather pipe at its forward end, of means for lubricating the pull collar, said means comprising a pipe, the forward end of said pipe extending into the breather pipe and an upwardly extending scoop disposed within the breather pipe and connected to the forward end of the pipe, the rear end of said pipe being disposed adjacent the pull collar.

In testimony whereof I have signed my name to this specification in the presence of two subscribing witnesses.

WALTER P. FLYNN.

Witnesses:
W. H. LEGG,
J. C. HURLEY.